United States Patent Office 3,341,339
Patented Sept. 12, 1967

3,341,339
LIGHTWEIGHT CASTABLE REFRACTORY
COMPOSITION
Joseph L. Stein, Cherry Hill, N.J., assignor to General Refractories Company, Philadelphia, Pa., a corporation of Pennsylvania
No Drawing. Filed Mar. 2, 1965, Ser. No. 436,641
15 Claims. (Cl. 106—64)

ABSTRACT OF THE DISCLOSURE

A lightweight insulating castable refractory composition characterized by low shrinkage at firing temperatures is prepared from: about 30 to about 70 parts of vesicular granules of thermally bloated clay having a pyrometric cone equivalent of at least 20 Orton, which granules themselves exhibit substantial shrinkage upon firing; about 15 to about 55 parts by crude kyanite, and about 15 to about 40 parts of calcium aluminate cement.

The present invention relates to a novel castable refractory composition; and, more particularly, the present invention relates to a light-weight insulating castable refractory composition adapted for use at relatively high temperatures.

Insulating castable refractory compositions are used in industrial furnaces as back up insulation behind a heavier working lining or as the exposed working lining itself when conditions permit. Such compositions are used mainly in areas where the laying of insulating brick is too expensive or is too intricate, as where the required shape is complex or structures—like refractory anchors and studs—are present in the area to be insulated. Normally, therefore, the castable refractory will be formed in situ in the place of utilization, although, on occasion, it is possible to cast the material in molds to make special shapes which, after curing, and preferably also drying, are installed.

However, because castable refractories are normally formed in situ it is a requirement thereof that they shrink less than 1.5% (linear) on heating to service temperatures.

Known light-weight, insulating castable refractory compositions are mixtures of lightweight, pore-forming material; a hydraulic setting, refractory cement, most usually calcium aluminate cement, and refractory filler, like calcined clay, calcined bauxite, mullite, kyanite (raw or calcined), and the like. The materials are usually dry blended. To the resulting castable refractory composition, water is added to form a plastic mass which can be cast into the desired shape by pouring, tamping, vibrating, gunning or the like.

The lightweight, pore-forming materials have included granules of diatomaceous earth; porous aggregates from shale and low grade clay, like Haydite; expanded vermiculite, expanded perlite, granulated mineral wool and asbestos (see U.S. Patents 2,963,377, 3,010,835, 3,079,-267, 2,793,128 and 2,043,249). Many of these materials, when combined with calcium aluminate cement and filler like calcined bauxite, mullite or calcined clay, result in castable compositions which have undesirably low service temperatures because of fusion or shrinkage at higher temperatures. Hence, the utility of this type of composition is limited to that of back up insulation where lower temperatures are involved.

Very light pore-forming materials, like perlite, will produce the desired low bulk density while allowing the bulk of the composition to be very refractory materials like bauxite, kaolin, kyanite and alumina grogs. The service temperature of such compositions is high. However, such compositions possess undesirable features which prevent their more extensive use in industrial furnace linings. For example, such compositions are subject to wide variation. The fragile perlite particles are easily damaged during original blending in making the dry composition or during mixing with water for installation. It has been found that the water content of the plastic mix markedly affects the bulk density of the ultimate cured cast refractory. Depending upon the type of mixer used, the bulk density of the ultimate cured product can carry as much as 15%. For application by gunning, the water content must be kept low to prevent slumping—and this results in a final product of higher bulk density than is desired with this type of product. The water requirement based on the dry weight is usually from 25 to 80%. Such compositions are difficult to dry out; the cured product after being heated at 230° F. for 24 hours still contains a substantial amount of water, as evidenced by the large drop in bulk density after firing at 2000° F. for 5 hours. The presence of this water requires further drying for as much as several more days. Such time-consuming curing and drying operations seriously delay furnace construction jobs. In certain compositions of this type the ratio of water to calcium aluminate cement is so far in excess of 1:1 that the potential strength of the composition is not attained. Moreover, expanded perlite contributes little to crushing strength in the product making the product dependent upon the content of calcium aluminate cement for strength. Increasing the content of the cement, however, to provide desired high strengths seriously impairs refractoriness—and hence service temperature—of the product.

It is, therefore, the principal object of the present invention to provide a novel, improved lightweight insulating castable composition.

It is another object of the present invention to provide a lightweight, insulating castable refractory composition which combines high strength with low density while maintaining other desirable features, including superior handling, casting, curing, drying and high temperature service capabilities as exposed furnace linings as well as back up insulation.

A further object of the invention is to provide a novel improved lightweight insulating castable refractory composition which requires relatively small and relatively uniform additions of water for casting, and which, after curing, can be dried thoroughly within a relatively short time.

Still another object of the invention is to provide a novel, improved lightweight, insulating castable refractory composition which is capable of use at service temperatures of from about 2500° F. to about 2800° F. and will exhibit less than 1.5% linear shrinkage upon firing to this temperature.

Yet another object of the invention is to provide a novel, improved lightweight insulating castable refractory composition which does not densify unduly when applied by pneumatic gunning techniques.

Other objects, including the provision of a novel, lightweight insulating castable refractory composition which possesses the foregoing advantageous features and characteristics and which is readily prepared from available, relatively inexpensive raw materials, will become apparent from a consideration of the following specification and the claims.

The lightweight, insulating castable refrectory compositions of the present invention consist essentially of from about 30 to about 70 parts of vesicular granules of thermally bloated clay having a pyrometric cone equivalent of at least 20 Orton, said granules having a bulk density no greater than about 35 pounds per cubic foot; from about 15 to about 55 parts of crude kyanite; and from about 15 to about 40 parts of calcium aluminate cement, said parts being parts by weight based upon the combined dry weight of said three ingredients.

The preferred compositions consist essentially of from about 40 to about 60 parts of the bloated clay granules and from about 20 to about 40 parts of crude kyanite, the calcium aluminate cement being in the above-mentioned general range.

The foregoing composition possesses many desirable and unobvious features and characteristics. It requires the addition of relatively little water to form the desired plastic mass for casting; generally water in the range of from about 12 to about 24%, by weight, based on the dry batch mix. Moreover, the water required does not vary widely from batch to batch, depending, for example, upon the type of mixer used, so that density variations due to variations in water content are kept to a minimum. The plastic composition can readily be applied by pouring, tamping or vibrating and will not densify unduly when applied by pneumatic gunning techniques. In addition, after casting and curing, the material can be dried thoroughly within 24 hours at 230° F., and can be subjected to firing conditions immediately thereafter. The compositions may be used where they may encounter temperatures from about 2500 to about 2800° F. depending upon the exact composition used, and will exhibit less than 1.5% linear shrinkage upon firing to such temperatures. This low—or even negative—shrinkage feature is surprising since the defined granules either alone or simply mixed with clay, upon firing result in substantial shrinkage which, even when clay is present, is not attributable to the clay. The product also exhibits good strength at service temperatures. The composition is simply made, by conventional blending and mixing techniques, from relatively inexpensive and available raw material.

The defined bloated clay granules have relatively recently come on the market. They are prepared by forming pellets of fine clay, having a pyrometric cone equivalent of at least 20 Orton, and water, and the resulting pellets will have the same pyrometric cone equivalent. A bloating agent, like wheat flour, may also be included. The pellets are dried and then dropped freely down a vertical furnace shaft where they encounter gas temperatures in the neighborhood of 2900-3000° F. and flame temperatures in the neighborhood of 3600° F. in a very short space of time. This heat treatment causes the pellets to bloat, expanding well beyond its original size to a vesicular granule containing cells and a vitrified (vitreous) blistered skin. In appearance upon magnification, the pellets are much like the well-known oven-toasted rice breakfast cereal. The clay from which the granules are made will have a pyrometric cone equivalent of at least 20 (Orton). The pyrometric cone equivalent may go up to 34. Preferred clays are those providing a pyrometric cone equivalent of between about 26 and about 32. The clay used will be a refractory clay; that is, it will be at least one of those selected from kaolin, ball clay and fire clay.

The granules will, of course, be light in weight and will have a bulk density less than about 35 pounds per cubic foot, and the bulk density may go down to about 10 pounds per cubic foot. In most cases, however, the bulk density does not go much below 20 pounds per cubic foot. Density depends upon the extent of thermal bloating which is largely a function of time, temperature, pellet size and refractoriness of the clay. Preferably, the bloated granules will be of a size that substantially all thereof (at least about 85–90%) pass through a 6 mesh screen (Tyler), but substantially none (no more than about 10–15%) passes through a 48 mesh screen. A screen analysis of a typical batch of bloated clay granules of the type described is:

Mesh (Tyler): Percent
On 6 ---------------------------------- 0.1
On 8 ---------------------------------- 0.1
On 10 --------------------------------- 1.5
On 14 --------------------------------- 14.5
On 28 --------------------------------- 83.7
On 35 --------------------------------- 0.1
On 48 --------------------------------- 0.0
On 65 --------------------------------- 0.0
Through 65 ---------------------------- 0.0

The principal binder employed in the compositions of the present invention is calcium aluminate cement which is a well known hydraulic cement of commerce. The preferred calcium aluminate cements contain less than 2% of $Fe_2O_3$. Advantageously, the cement is finely-ground such that substantially all thereof passes through a 100 mesh screen, and preferably through a 200 mesh screen. Analyses of typical cements of this type are:

| | A | B | C | D | E |
|---|---|---|---|---|---|
| $Al_2O_3$ | 79.98 | 53.16 | 41.08 | 73.93 | 66.60 |
| CaO | 17.84 | 34.96 | 35.20 | 24.32 | 22.96 |
| $Fe_2O_3$ | 0.39 | 1.53 | 9.98 | 0.26 | 0.66 |
| $SiO_2$ | 0.13 | 5.66 | 7.90 | 0.16 | 4.11 |
| $TiO_2$ | 0.004 | 1.30 | 0.80 | 0.004 | 0.19 |
| MgO | 0.18 | 0.51 | 1.60 | 0.18 | 0.51 |
| MnO | 0.031 | 0.023 | 0.10 | 0.012 | 0.039 |
| $Na_2O$ | 0.30 | <0.10 | <0.10 | 0.30 | 0.15 |
| S as $SO_3$ | 0.025 | 0.33 | 0.32 | 0.09 | 1.20 |
| Sulfide as $SO_3$ | 0.01 | 0.12 | 0.19 | 0.01 | 1.06 |
| −200 mesh, percent | 97.6 | 93.6 | 92.1 | 97.8 | 91.1 |
| −325 mesh, percent | 93.4 | 78.6 | 80.8 | 90.4 | 73.0 |
| Sp. gr. | 3.35 | 3.00 | 3.11 | 3.00 | 3.04 |

The principal filler employed in the compositions of the present invention is crude or raw (uncalcined) kyanite, also a well known article of commerce. Analyses of typical kyanites are:

$Al_2O_3$, 58.7%, 66.81%; $SiO_2$, 37.7%, 30.70%; $Fe_2O_3$, 1.2%, 0.13%; and $TiO_2$, 1.3%, 2.26%.

Domestic raw kyanite as marketed is relatively fine, substantially all thereof passing through a 35 mesh screen, and may be used as such. Preferably, the kyanite is finely-ground such that substantially all thereof passes through a 100 mesh screen.

It has also been found that up to about 25%, based on the weight of the bloated clay granules, calcium aluminate cement and raw kyanite, of an inert, refractory filler may also be included without deleteriously affecting the advantageous characteristics of the present composition. Hence, the inclusion of such a filler is included herein and in the claims where reference is made to the composition as consisting essentially of the bloated clay granules, calcium aluminate cement and crude kyanite. Examples of such inert refractory fillers are calcined kyanite, calcined refractory clay (kaolin, ball clay or fire clay), calcined bauxite and mullite.

In preparing the composition the stated ingredients are simply blended together. To apply, water is added to provide a formable plastic mass having the consistency dictated by the particular mode of application. The plastic mix may be applied by any of the methods used for castable refractories, such as pouring, tamping, vibrating or gunning. After application, the damp, shaped mix is allowed to stand at ambient temperatures to permit the cement to hydrate (cure), and then it may be heated to facilitate drying. At 230° F. the material should be thoroughly dry within 24 hours and ready to be subjected to service temperatures.

The present invention may be more readily understood from a consideration of the following specific examples which are given for the purpose of illustration and are not intended to limit the scope of the invention in any way.

Examples I–V

Mixes are prepared of bloated clay granules having a bulk density of about 30 pounds per cubic foot and a pyrometric cone equivalent of 27–29 (clay is typical fire clay common to Pennsylvania-Ohio region), calcium aluminate cement (78% $Al_2O_3$; 18% CaO; 0.4% $Fe_2O_3$; 0.2% MgO—97.6% through 200 mesh) and crude kyanite (58.7% $Al_2O_3$; 37.7% $SiO_2$; 1.2% $Fe_2O_3$; 1.3% $TiO_2$— substantially all through 100 mesh) in the proportions set forth in the following Table I. Water is added in an amount as also set forth in the table. From these mixes test specimens are prepared and tested as follows: modulus of rupture according to ASTM C268–62T (specimen preparation according to paragraphs 4, 5 and 6); cold crushing strength according to ASTM C133–55 (specimen preparation according to paragraph 4) and permanent linear change according to ASTM C269–61T (specimen preparation according to paragraphs 4, 5 and 6). Volume change is determined on the specimens prepared and tested for linear change.

TABLE I

| | I | II | III | IV | V |
|---|---|---|---|---|---|
| Bloated clay granules (wt. percent) | 30 | 40 | 50 | 60 | 50 |
| Calcium aluminate cement (wt. percent) | 15 | 25 | 20 | 20 | 35 |
| Crude kyanite (wt. percent) | 55 | 35 | 30 | 20 | 15 |
| Water (percent of dry mix) | 18.3 | 15.8 | 16.1 | 16.6 | 15.0 |
| Bulk density (lbs./cu. ft.): | | | | | |
| After drying at 230° F., 24 hours | 81 | 79 | 62 | 51 | 64 |
| After 2,000° F | 77 | 73 | 59 | 50 | 59 |
| After 2,550° F | 71 | 71 | 56 | 52 | 61 |
| Modulus of rupture (p.s.i.): | | | | | |
| After drying at 230° F., 24 hours | 307 | 419 | 302 | 221 | 229 |
| After 2,000° F | 461 | 407 | 166 | 93 | 105 |
| After 2,550° F | 897 | 661 | 334 | 172 | 272 |
| Linear change (percent): | | | | | |
| Upon firing to 2,000° F | −0.29 | +0.26 | −0.22 | −0.44 | −0.41 |
| Upon firing to 2,550° F | +2.89 | +2.26 | +0.89 | 0.00 | −0.29 |
| Volume change (percent): | | | | | |
| Upon firing to 2,000° F | +0.11 | +0.4 | −0.51 | −2.24 | −0.63 |
| Upon firing to 2,550° F | +9.68 | +6.8 | +1.44 | −3.40 | −1.96 |
| Cold crushing strength (p.s.i.): | | | | | |
| After drying at 230° F., 24 hours | 1,238 | 2,016 | 976 | 642 | 1,176 |
| After 2,000° F | 1,380 | 1,688 | 581 | 312 | 737 |
| After 2,550° F | 1,847 | 2,090 | 667 | 650 | 822 |

The compositions of Examples I–V are also subjected to firing at their estimated service temperatures with the following results:

TABLE II

| | I | II | III | IV | V |
|---|---|---|---|---|---|
| Bulk density (lbs./cu. ft.) | 71 | 70 | 56 | 55 | 61 |
| Cold crushing strength (p.s.i.) | 1,542 | 1,326 | 635 | 547 | 822 |
| Modulus of rupture (p.s.i.) | 758 | 714 | 421 | 297 | 272 |
| Linear change (percent) | +3.04 | +2.38 | +1.63 | −0.82 | −0.29 |
| Volume change (percent) | +10.34 | +6.64 | +2.49 | −6.50 | −1.96 |
| Temperature of firing, °F | 2,800 | 2,700 | 2,700 | 2,600 | 2,550 |

Example VI

This example illustrates the use of an inert, refractory filler. To a mix containing 40 parts, by weight, of bloated clay granules, 25 parts of calcium aluminate cement and 35 parts of crude kyanite, all as used in Examples I–V, are added 20 parts of calcined kaolin (through 48 mesh).

Testing, as in Examples I–V, gives the following results:

TABLE III

| | After 230° F. | After 2,550° F. |
|---|---|---|
| Bulk density (lbs./cu. ft.) | 91 | 85 |
| Cold crushing strength (p.s.i.) | 1,953 | 2,421 |
| Modulus of rupture (p.s.i.) | 324 | 895 |
| Linear change (percent) | | +0.89 |
| Volume change (percent) | | +2.49 |

Example VII

This example illustrates the marked shrinkage of the bloated clay granules when combined with clay and by themselves. Fifteen parts by weight of raw West Darlington fine clay when combined with 85 parts of stable calcined fire clay usually exhibits a volume shrinkage on the order of 2.5–3% upon firing at 2100–2300° F. However, when the clay is mixed with the bloated clay granules used in the foregoing examples in proportions as set forth in the following table, molded into test specimens at 1000 p.s.i. as set forth in the following table, and fired at the temperatures shown, the following volume shrinkages are found.

TABLE IV

| | | | |
|---|---|---|---|
| Bloated clay granules (pts.) | 55 | 75 | 85 |
| West Darlington clay (pts.) | 45 | 25 | 15 |
| Lignosulfonate binder (pts.) | 2 | 2 | 2 |
| Water (pts.) | 4.5 | 4.5 | 4.5 |
| Volume shrinking (percent): | | | |
| After firing at 2,100° F | 9.05 | 8.76 | 9.63 |
| After firing at 2,200° F | 12.06 | 11.46 | 11.73 |
| After firing at 2,300° F | 13.80 | 15.38 | 15.70 |

In addition, a quantity of the bloated clay granules alone, when heated to 2200° F. in 4½ hours and held at that temperature for 3 hours, exhibited a volume shrinkage of about 15%.

Modification is possible in the selection of the particular materials and relative proportions thereof as well as in the particular techniques employed in preparing and using the compositions without departing from the scope of the invention.

I claim:

1. A lightweight insulating castable refractory composition, exhibiting a linear shrinkage of less than 1.5% upon firing at a temperature of from about 2500 to about 2800° F., consisting essentially of from about 30 to about 70 parts of vesicular granules of thermally bloated clay having a pyrometric cone equivalent of at least 20 Orton, said granules having a bulk density no greater than about 35 pounds per cubic foot; from about 15 to about 55 parts of crude kyanite; and from about 15 to about 40 parts of calcium aluminate cement, said parts being parts by weight based upon the combined dry weight of said three ingredients, and said granules being further characterized in having a vitreous skin and exhibiting substantial shrinkage upon firing.

2. The composition of claim 1 wherein said thermally bloated clay granules have a particle size such that substantially all thereof pass through a 6 mesh screen.

3. The composition of claim 1 wherein said thermally bloated clay granules have a bulk density of at least about 10 pounds per cubic foot.

4. The composition of claim 1 wherein said thermally bloated clay granules have a bulk density of at least about 20 pounds per cubic foot.

5. The composition of claim 1 wherein said thermally bloated clay has a pyrometric cone equivalent of between about 26 and about 32.

6. The composition of claim 1 wherein said calcium aluminate cement contains less than 2% of $Fe_2O_3$.

7. The composition of claim 1 wherein said crude kyanite has a particle size such that substantially all thereof passes through a 100 mesh screen.

8. The composition of claim 1 wherein said thermally bloated clay granules have a pyrometric cone equivalent of between about 26 and about 32 and a bulk density of at least about 10 pounds per cubic foot; wherein said thermally bloated clay granules have a particle size such that substantially all thereof pass through a 6 mesh screen; wherein said calcium aluminate cement contains less than 2% $Fe_2O_3$, and wherein said crude kyanite has a particle size such that substantially all thereof passes through a 100 mesh screen.

9. A lightweight insulating castable refractory composition, exhibiting a linear shrinkage of less than 1.5% upon firing at a temperature of from about 2500 to about 2800° F., consisting essentially of from about 40 to about 60 parts of vesicular granules of thermally bloated clay having a pyrometric cone equivalent of at least 20 Orton, said granules having a bulk density no greater than 35 pounds per cubic foot; from about 20 to about 40 parts of crude kyanite; and from about 15 to about 40 parts of calcium aluminate cement, said parts being parts by weight based upon the combined dry weight of said three ingredients, and said granules being further characterized in having a vitreous skin and exhibiting substantial shrinkage upon firing.

10. The composition of claim 9 wherein said thermally bloated clay granules have a particle size such that substantially all thereof pass through a 6 mesh screen.

11. The composition of claim 9 wherein said thermally bloated clay granules have a bulk density of at least about 10 pounds per cubic foot.

12. The composition of claim 9 wherein said thermally bloated clay granules have a bulk density of at least about 20 pounds per cubic foot.

13. The composition of claim 9 wherein said thermally bloated clay as a pyrometric cone of between about 26 and about 32.

14. The composition of claim 9 wherein said calcium aluminate cement contains less than 2% of $Fe_2O_3$.

15. The composition of claim 9 wherein said crude kyanite has a particle size such that substantially all thereof passes through a 100 mesh screen.

References Cited
UNITED STATES PATENTS

| | | | |
|---|---|---|---|
| 2,419,684 | 4/1947 | Johnson et al. | 106—64 |
| 2,963,377 | 12/1960 | Renkey | 106—64 |

TOBIAS E. LEVOW, *Primary Examiner.*

J. E. POER, *Assistant Examiner.*